Patented May 8, 1951

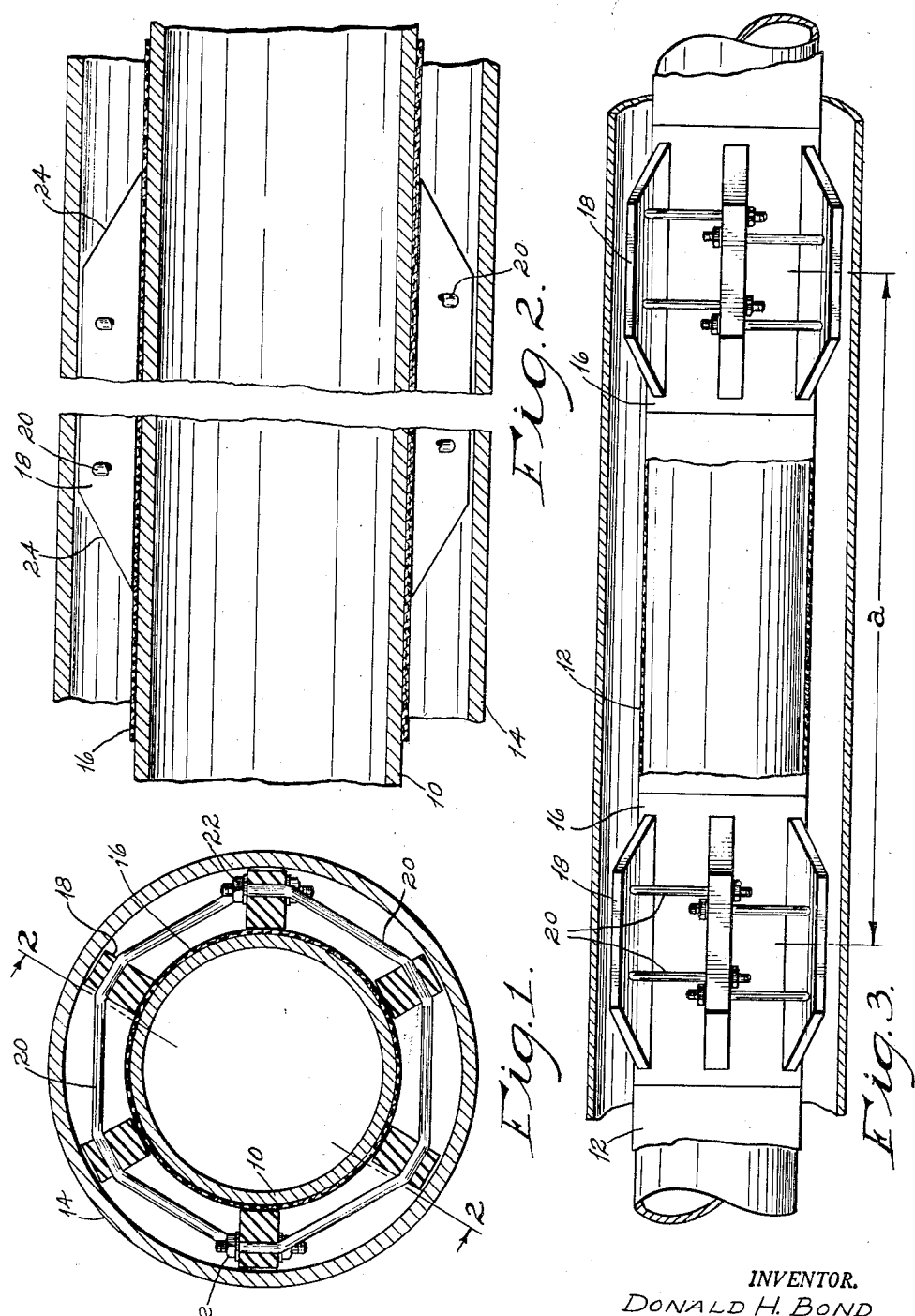

2,551,867

UNITED STATES PATENT OFFICE 2,551,867

CONCENTRIC PIPE INSULATOR AND SPACER

Donald H. Bond, Houston, Tex., assignor to The Texas Company, New York, N. Y., a corporation of Delaware Application September 13, 1947, Serial No. 773,885

7 Claims. (Cl. 174—28)

This invention relates to devices for insulating pipe, more particularly to devices for electrically insulating and spacing one pipe concentrically within another pipe. The principal object of the invention is to provide a device or devices of this type which will provide good electrical insulation between the two pipes and which will accurately space or center one pipe within another, while providing a minimum of friction resistance and preventing damage to any coating on the inner pipe when the inner pipe is drawn or pushed within the outer pipe.

In the construction of pipe lines for conducting oil and the like, it is the present practice in many instances to place the oil conducting pipe within an outer pipe or casing and to electrically insulate the pipes from each other throughout their lengths. Due to such insulation it has been found possible to greatly reduce the power requirements when cathodic protection is applied to the pipe line involved, for preventing corrosion thereof.

Various attempts have been made to provide insulators and spacers for this purpose, but in most cases, the material used has either not been a sufficiently good electrical insulator, or the devices have not been sufficiently rugged to stand up when the inner pipe lengths are pulled within the outer casing.

In accordance with the invention, a plurality of sets or groups of insulator or spacer members are firmly secured in spaced relation around the outside surface of the inner pipe, and these members are formed of a material which has a high dielectric and mechanical strength with low moisture absorption properties such as Bakelite. The inner pipe is normally coated with a layer of perhaps ⅛" thickness of a material such as asphaltum, felt or kraft paper. It is preferred that any outer felt or kraft paper coating be removed and replaced with another coating of about three layers of fiber glass at those places where the groups of spacer elements are positioned. In one group any desired number of the elements may be used and it has been found that where the inner pipe is from say 4 to 8" in diameter, six elements per group are satisfactory. Each of the elements is square or rectangular in cross-section and may vary in length depending upon the sizes of pipe involved. The elements are placed around the fiber glass coating on the inner pipe in uniformly separated relation with their longitudinal axis parallel to the longitudinal axis of the pipe.

The elements are preferably maintained in position by stranded steel cable, metal rods, or bars, which are passed through the elements and bent so that alternate rods will pass through the elements positioned as opposite sides of the pipe. The ends of the cable may have threaded studs attached thereto, or the ends of rods may be threaded and when cooperating nuts are tightened on the alternately arranged rods the elements in a group will be pulled tightly toward the surface of the inner pipe. The outer surface or edge of each of the elements is preferably tapered towards the inner pipe so that when attached, the groups of elements will act as sled runners to permit relative lengthwise movement between the inner and outer pipes.

For a better understanding of the invention, reference may be had to the accompanying drawing in which:

Fig. 1 is a cross-section through a group of spacer elements in place between an inner pipe and its outer casing;

Fig. 2 is a longitudinal cross-section on the line 2—2 of Fig. 1, and,

Fig. 3 is a longitudinal view partly in section, showing two groups of the spacer elements in place.

Referring to the drawing, a pipe 10 which may be a length of an oil pipe line, for example, is coated with a layer 12 of a material such as asphaltum and/or kraft paper. The inner pipe 10 is axially disposed within an outer pipe or casing 14 which may rest upon or be buried in the earth.

At desired intervals $a$ throughout the length of the pipe, the outer paper coating 12 is removed and replaced, preferably with a coating 16 consisting of about three layers of fiber glass. A number of groups or sets of insulating and spacing elements 18 are disposed at intervals throughout the length of the pipe and as shown in the drawing, each group consists of six uniformly spaced elements.

Each of the elements 18 is formed of an elongated bar of a material having a high dielectric and mechanical strength with low moisture absorption properties such as, for example, the phenolic condensation product, Bakelite, and may be rectangular in cross-section, and several inches in length. The height of each element is substantially equal to or very slightly less than the distance between the outer surface of the fiber glass coating 16 and the inner surface of the casing 14. A plurality of rods or bars 20 serve to hold the elements in place, each of these bars being more or less U shaped and having threaded ends on which nuts 22 are adapted to be screwed.

As is shown more clearly in Fig. 1, each of the elements of one pair of each group is provided with four holes adapted to accommodate the end portions of four of the rods 20, while the remaining elements are provided with two holes each. If desired, the rods 20 may be forced through the holes in the elements and then bent to the configuration shown in Fig. 1 or if desired the elements may be molded about the pre-formed rods. The rods 20 are arranged in alternating relation as shown in Fig. 3. When the nuts 22 are tightened, the elements of a group will be drawn towards the center of the inner pipe and will be clamped firmly against the coating 16. With this arrangement there would be little likelihood that the elements will twist or become loose. Each of the elements 18 is provided with tapered ends 24 so that each serves as a sled runner when the inner pipe 10 is pulled within the outer casing 14. With this arrangement the groups of elements offer little if any resistance when the inner pipe is pulled or pushed into the casing. It has been found that for the distance a between the spacer groups, 15 feet is satisfactory, although this may of course vary, depending upon the size of the pipes 10 and 14 and the weight of pipe 10.

Instead of the more or less rigid bars 20, lengths of cable may be used, the ends of the cable lengths being provided with threaded caps or other suitable means for attachment of the nuts 22.

Obviously many modifications and variations of the invention, as hereinbefore set forth, may be made without departing from the spirit and scope thereof, and therefore only such limitations should be imposed as are indicated in the appended claims.

I claim:

1. A device for uniformly spacing and electrically insulating an inner fluid conducting pipe from an outer pipe casing comprising a plurality of elongated spacer elements disposed in parallel to and in separated relation about the periphery of said inner pipe, each of said elements being formed of a material having a high dielectric and mechanical strength and low moisture absorption properties, means for rigidly clamping said elements to said inner pipe, said means comprising a plurality of U shaped rods disposed laterally through said elements and arranged in pairs in opposing relation about opposite sides of said inner pipe, and means for drawing the rods of each pair toward each other to tighten said elements against the inner pipe.

2. A device for uniformly spacing and electrically insulating an inner fluid conducting pipe from an outer pipe casing comprising a plurality of elongated spacer members disposed in parallel to and in separated relation about the periphery of said inner pipe, each of said members being formed of a material having a high dielectric and mechanical strength and low moisture absorption properties, means for rigidly clamping said members to said inner pipe, said means comprising a plurality of elements disposed laterally through said members and arranged in pairs in opposing relation about opposite sides of said inner pipe, and means for drawing the elements of each pair toward each other to tighten said members against the inner pipe.

3. An assembly for a pipe line comprising an outer pipe casing, an inner fluid conducting pipe, a coating of electrically insulating material around and in contact with a portion of said inner pipe, means for centrally spacing and electrically insulating said inner pipe from said outer pipe comprising a plurality of elongated separate spacer members of a hard electrically insulating material disposed in parallel to the longitudinal axis of said pipes and in separated relation about said inner pipe portion in contact with said coating, and means for clamping said members tightly against said pipe coating in said separated relation, said means comprising a plurality of elements disposed laterally through said members and arranged in pairs in opposing relation about opposite sides of said inner pipe, and means for drawing the elements of each pair toward each other to tighten said members against the inner pipe.

4. A device according to claim 2 in which the end portions of the spacer members taper toward said inner pipe, the maximum height of each element being substantially equal to the distance of the outer surface of the inner pipe and the inner surface of the outer casing.

5. An assembly according to claim 3 in which the end portions of the spacer members taper toward said inner pipe to provide runners so that the inner pipe with the spacer members clamped thereto can be readily pulled or pushed within the outer casing.

6. A device for uniformly spacing and electrically insulating an inner fluid conducting pipe from an outer pipe casing comprising a plurality of elongated spacer members disposed in parallel to and in separated relation about the periphery of said inner pipe, each of said members being formed of a material having a high dielectric and mechanical strength and low moisture absorption properties, means for rigidly clamping said members to said inner pipe, said means comprising a plurality of elements arranged in pairs in opposing relation about the opposite sides of said inner pipe and connecting laterally with said spacer members, and means for drawing the elements of each pair toward each other to tighten said members against the inner pipe.

7. A device for uniformly spacing and electrically insulating an inner fluid conducting pipe from an outer pipe casing comprising a plurality of elongated spacer members disposed in separated relation about the periphery of, and parallel to, the longitudinal axis of said inner pipe, each of said members being formed of a material having a high dielectric and mechanical strength and low moisture absorption, clamping means comprising at least a pair of substantially semicircular elements arranged in opposing relation about opposite sides of said inner pipe and connecting laterally with said spacer members, the point of connection being substantially removed from the surface of contact between said spacer members and the inner periphery of the outer pipe casing, and means for drawing said semicircular elements toward each other to tighten said spacer elements against the inner pipe.

DONALD H. BOND.

REFERENCES CITED

The following references are of record in the file of this patent:

UNITED STATES PATENTS

| Number | Name | Date |
|---|---|---|
| 225,861 | Parod | Mar. 23, 1880 |
| 1,940,780 | Wilson | Dec. 26, 1933 |
| 2,153,787 | Anderson | Apr. 11, 1939 |
| 2,444,206 | Pease | June 29, 1948 |

FOREIGN PATENTS

| Number | Country | Date |
|---|---|---|
| 47,617 | France | June 15, 1937 |
| 834,165 | France | Aug. 8, 1938 |
| 538,119 | Great Britain | July 22, 1941 |